US010735872B2

(12) United States Patent
Shriner et al.

(10) Patent No.: US 10,735,872 B2
(45) Date of Patent: Aug. 4, 2020

(54) HEARING DEVICE INCORPORATING PHASED ARRAY ANTENNA ARRANGEMENT

(71) Applicant: Starkey Laboratories, Inc., Eden Prairie, MN (US)

(72) Inventors: Paul Anders Shriner, Hopkins, MN (US); Gregory J. Haubrich, Champlin, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 16/059,778

(22) Filed: Aug. 9, 2018

(65) Prior Publication Data

US 2020/0053490 A1 Feb. 13, 2020

(51) Int. Cl.

| | |
|---|---|
| ***H04R 25/00*** | (2006.01) |
| ***H04W 16/28*** | (2009.01) |
| ***H01Q 1/27*** | (2006.01) |
| ***H01Q 3/26*** | (2006.01) |
| ***H01Q 3/38*** | (2006.01) |

(52) U.S. Cl.

CPC ........... *H04R 25/554* (2013.01); *H01Q 1/273* (2013.01); *H01Q 3/2617* (2013.01); *H01Q 3/38* (2013.01); *H04R 25/558* (2013.01); *H04R 2225/51* (2013.01)

(58) Field of Classification Search

CPC .... H04B 7/0617; H04B 7/086; H04B 17/336; H01Q 3/36; H01Q 21/00; H01Q 21/06; H01Q 21/065; H01Q 3/2611; H04W 16/28

USPC .................................. 455/25, 63.4; 381/312

See application file for complete search history.

(56) References Cited

U.S. PATENT DOCUMENTS

| | | | |
|---|---|---|---|
| 5,905,473 A | 5/1999 | Taenzer | |
| 2012/0014525 A1 | 1/2012 | Ko et al. | |
| 2013/0218228 A1* | 8/2013 | Goossen | A61N 1/3718 607/32 |
| 2013/0308717 A1* | 11/2013 | Maltsev | H04B 7/0417 375/267 |
| 2016/0380355 A1* | 12/2016 | Lysejko | F16M 11/06 343/853 |
| 2017/0272873 A1 | 9/2017 | Webster et al. | |

* cited by examiner

*Primary Examiner* — George C Monikang

(74) *Attorney, Agent, or Firm* — Shumaker & Sieffert, P.A.

(57) ABSTRACT

A hearing device comprises a housing configured to be supported at, on or in a wearer's ear. A processor is coupled to memory, and the processor and memory are disposed in the housing. A radiofrequency transceiver is coupled to the processor and disposed in the housing. A phased array antenna arrangement is disposed in or on the housing and coupled to the transceiver and the processor. The phased array antenna arrangement comprises a plurality of antennas each coupled to one of a plurality of phase shifters. The processor is configured to adjust a phase shift of each of the phase shifters to steer an antenna array pattern.

23 Claims, 12 Drawing Sheets

HEARING DEVICE INCORPORATING PHASED ARRAY ANTENNA ARRANGEMENT

TECHNICAL FIELD

This application relates generally to hearing devices, including ear-worn electronic devices, hearing aids, personal amplification devices, and other hearables.

BACKGROUND

Hearing devices provide sound for the wearer. Some examples of hearing devices are headsets, hearing aids, speakers, cochlear implants, bone conduction devices, and personal listening devices. For example, hearing aids provide amplification to compensate for hearing loss by transmitting amplified sounds to a wearer's ear canals. Hearing devices may be capable of performing wireless communication with other devices, such as receiving streaming audio from a streaming device via a wireless link. Wireless communication may also be performed for programming the hearing device and receiving information from the hearing device. For performing such wireless communication, hearing devices such as hearing aids may each include a wireless transceiver and an antenna.

SUMMARY

Embodiments are directed to a hearing device comprising a housing configured to be supported at, on or in a wearer's ear. A processor is coupled to memory, and the processor and memory are disposed in the housing. A radiofrequency transceiver is coupled to the processor and disposed in the housing. A phased array antenna arrangement is disposed in or on the housing and coupled to the transceiver and the processor. The phased array antenna arrangement comprises a plurality of antennas each coupled to one of a plurality of phase shifters. The processor is configured to adjust a phase shift of each of the phase shifters to steer an antenna array pattern.

Embodiments are directed to a hearing device comprising a housing configured to be supported at, on or in a wearer's ear. A processor is coupled to memory, and the processor and memory are disposed in the housing. A radiofrequency transceiver is coupled to the processor and disposed in the housing. A phased array antenna arrangement is disposed in or on the housing and coupled to the transceiver and the processor. The phased array antenna arrangement comprises a plurality of antennas each coupled to one of a plurality of phase shifters and at least one of a plurality of variable gain amplifiers. The processor is configured to adjust a phase shift of each of the phase shifters to steer an antenna array pattern. The processor is further configured to adjust a gain of each of the variable gain amplifiers to one or more of reduce a side lobe of the antenna array pattern, change a location of the side lobe, and adjust a width of a main lobe of the antenna array pattern.

Embodiments are directed to a method implemented by a hearing device adapted to be worn at, on or in an ear of a wearer. The method comprises providing, at the hearing device, a phased array antenna arrangement coupled to a radiofrequency transceiver and a processor. The phased array antenna arrangement comprises a plurality of antennas each coupled to one of a plurality of phase shifters. The method comprises adjusting, by the processor, a phase shift of each of the phase shifters to steer an antenna array pattern.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
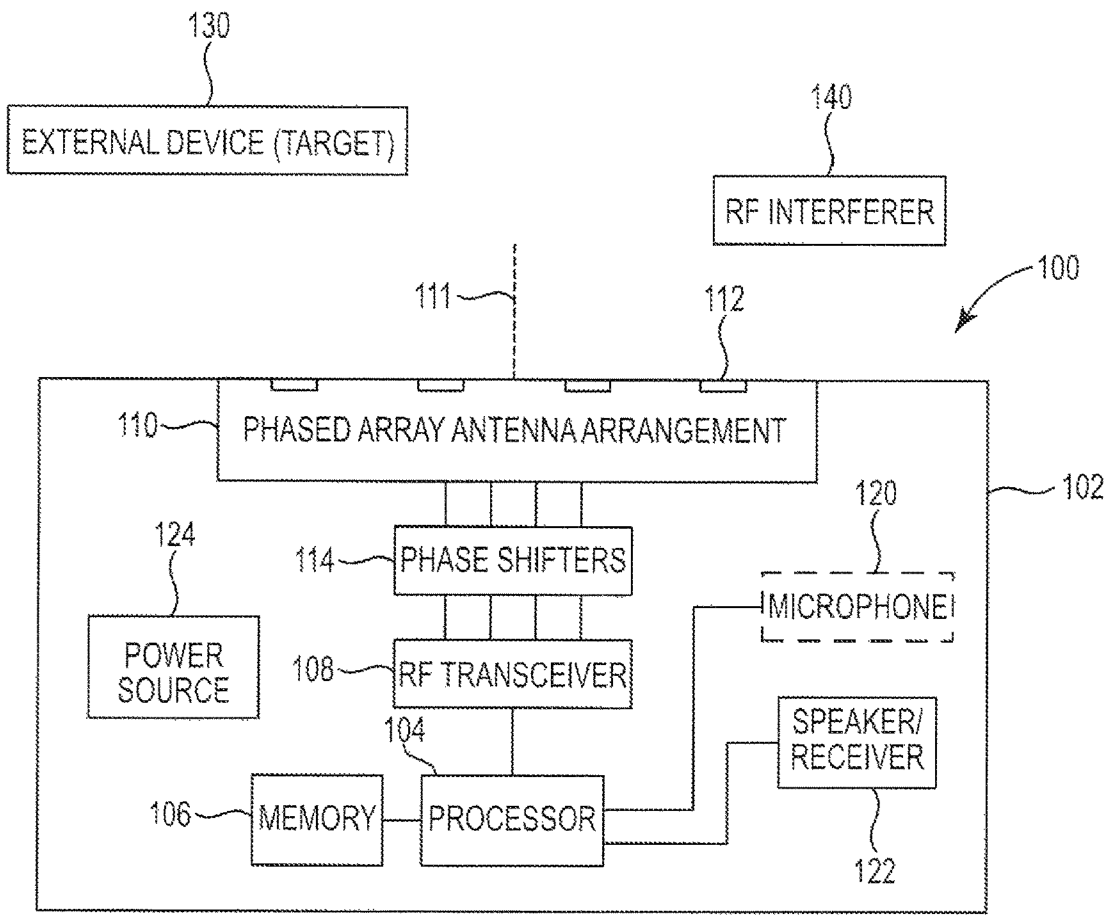
FIG. 1A illustrates a hearing device adapted to be worn at an ear of a wearer in accordance with various embodiments.

It is understood that the embodiments described herein may be used with any ear-worn electronic hearing device without departing from the scope of this disclosure. The devices depicted in the figures are intended to demonstrate the subject matter, but not in a limited, exhaustive, or exclusive sense. Ear-worn electronic hearing devices (referred to herein as "hearing devices"), such as hearables (e.g., wearable earphones, ear monitors, and earbuds), hearing aids, and hearing assistance devices, typically include an enclosure, such as a housing or shell, within which internal components are disposed. Typical components of a hearing device can include a digital signal processor (DSP), memory, power management circuitry, one or more communication devices (e.g., a radio, a near-field magnetic induction (NFMI) device), one or more antennas, one or more microphones, and a receiver/speaker, for example. Hearing devices can incorporate a long-range communication device, such as a Bluetooth® transceiver or other type of radio frequency (RF) transceiver. A communication device (e.g., a radio or NFMI device) of a hearing device can be configured to facilitate communication between a left ear device and a right ear device of the hearing device.

Hearing devices of the present disclosure can incorporate a phased array antenna arrangement coupled to a high-frequency transceiver, such as a 2.4 GHz radio. The RF transceiver can conform to an IEEE 802.11 (e.g., WiFi®) or Bluetooth® (e.g., BLE, Bluetooth® 4.2 or 5.0) specification, for example. It is understood that hearing devices of the present disclosure can employ other transceivers or radios, such as a 900 MHz radio. Hearing devices of the present disclosure can be configured to receive streaming audio (e.g., digital audio data or files) from an electronic or digital source. Representative electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files. In some embodiments, these and other accessory devices can incorporate a phased array antenna arrangement as described herein. Hearing devices of the present disclosure can be configured to effect bi-directional communication (e.g., wireless communication) of data with an external source, such as a remote server via the Internet or other communication infrastructure.

The term hearing device of the present disclosure refers to a wide variety of ear-level electronic devices that can aid a person with impaired hearing. The term hearing device also refers to a wide variety of devices that can produce processed sound for persons with normal hearing. Hearing devices of the present disclosure include hearables (e.g., wearable earphones, headphones, earbuds, virtual reality headsets), hearing aids (e.g., hearing instruments), cochlear implants, and bone-conduction devices, for example. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device," which is understood to refer to a system comprising a single left or right ear device or a combination of a left ear device and a right ear device.

Embodiments of the disclosure are directed to a hearing device that incorporates a radiofrequency (RF) transceiver coupled to a phased array antenna arrangement. The phased array antenna arrangement is configured to electronically steer an antenna array pattern of the phased array antenna arrangement in a direction that improves a wireless link between the hearing device and an external device or system (or other hearing device). The term antenna array pattern refers to a radiation pattern of a phase array antenna arrangement. In some cases, the phased array antenna arrangement is controlled to electronically steer a main beam or main lobe of the antenna array pattern towards the best position for the wireless link. In other cases, the phased array antenna arrangement is controlled to electronically steer a null of the antenna array pattern towards a source of interference, thereby improving the wireless link between the hearing device and a target external device or system. For example, a null of the antenna array pattern can be steered in a direction of a radiofrequency noise source or a multipath null contributor. In some cases, the phased array antenna arrangement is controlled to electronically steer both a main beam or lobe and a null of the antenna array pattern towards the best positions for the wireless link.

With increasing numbers of collocated devices utilizing technology in the 2.4 GHz ISM frequency band, it is increasingly likely that the wireless link between a hearing device and another device will be impacted by these external sources. By steering the antenna array pattern of the hearing device, the wireless link between the two devices can be improved. For example, hearing aids, hearables, wireless headsets, automobile/smartphone links, and WiFi®, all extensively use the 2.4 GHz ISM frequency band. By way of further example, a single in-band WiFi® transmitter due to its large bandwidth of up to 40 MHz is likely to cause interference to hearing devices (e.g., hearing instruments, hearing aids) using the 83.5 MHz wide ISM band. Additionally, even if not directly on-channel, large high power access points and nearby Bluetooth® users risk overloading the relatively low-power receivers in hearing devices (e.g., hearing aids). In addition to these interference sources, LTE cellphone bands 7, 40, and 41 are allocated for operation just below and above the 2.4 GHz ISM band. These interferers can run even more power, with SAW filtering unable to provide sufficient selectivity to reject this type of interference. This out-of-band interference can significantly desensitize the 2.4 GHz receivers of hearing device. Steering the antenna pattern null to the source of maximum interference can keep the hearing device's receiver and/or the hearing device accessory's receiver from being desensitized due to the finite interference rejection of a low power receiver. The antenna pattern may need to be steered/adjusted on a per-frequency/per-channel basis for frequency hopped/agile systems due to propagation being frequency dependent (e.g., due to multipath, etc.).

FIG. 1A illustrates a hearing device adapted to be worn at an ear of a wearer in accordance with various embodiments. The hearing device 100 shown in FIG. 1A includes a housing 102 configured to be supported at, on or in the wearer's ear. Disposed within the housing 102 is a processor 104 coupled to memory 106. The processor 104 can include or be implemented as a multi-core processor, a DSP, an audio processor or a combination of these processors. In some embodiments, the hearing device 100 includes a microphone 120 mounted on the housing 102, which can be a single microphone or multiple microphones (e.g., a microphone array). The microphone 120 can be coupled to a preamplifier (not shown), the output of which is coupled to the processor 104. A speaker or receiver 122 of the hearing device 100 is coupled to an amplifier (not shown) and the processor 104. The speaker or receiver 122 is configured to generate sound which is communicated to the wearer's ear. A power source 124, such as a rechargeable battery, provides power for the components of the hearing device 100.

Figure 1B:
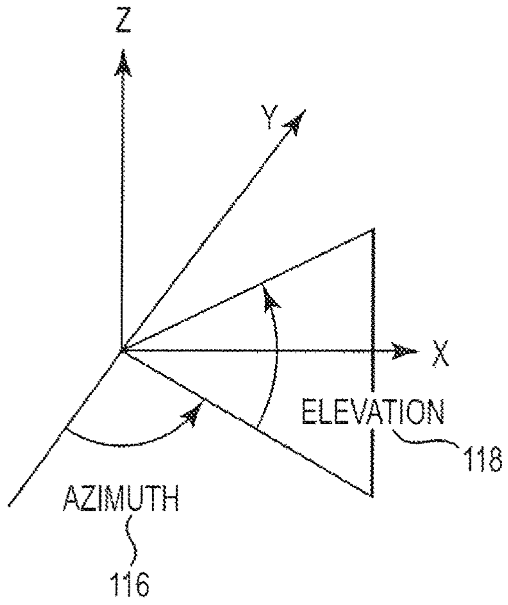
FIG. 1B illustrates that an antenna array pattern of a phased array antenna arrangement can be electronically steered in one or both of an azimuth plane and an elevation plane in accordance with various embodiments.

A radiofrequency (RF) transceiver 108 is coupled to the processor 104 and disposed in the housing 102. A phased array antenna arrangement 110 is disposed in and/or on the housing 102 and coupled to the RF transceiver 108 and the processor 104. The phased array antenna arrangement 110 includes a plurality of antennas 112 each coupled to one of a plurality of phase shifters 114. The processor 104 is configured to adjust a phase shift of each of the phase shifters 114 to electronically steer an antenna array pattern, such as in one or both of an azimuth plane 116 and an elevation plane 118 as shown in FIG. 1B. The antenna array pattern can be steered by the processor 104 and the phase shifters 114 when the phased array antenna arrangement 110 operates in a transmit mode and in a receive mode.

Figure 1C:
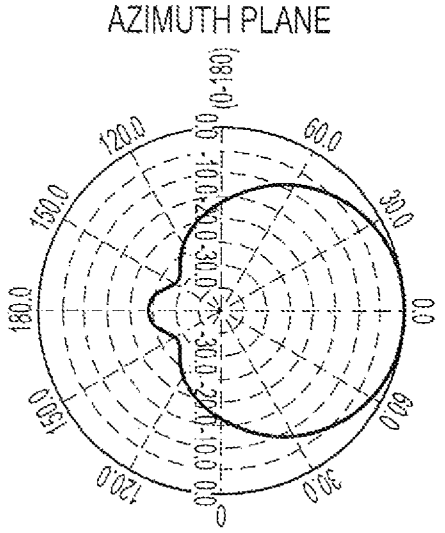
FIG. 1C shows a representative antenna pattern on the azimuth plane.
Figure 1D:
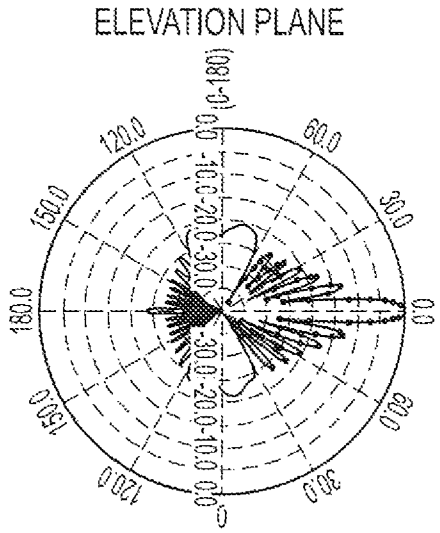
FIG. 1D shows a representative antenna pattern on the elevation plane.
Figure 1E:
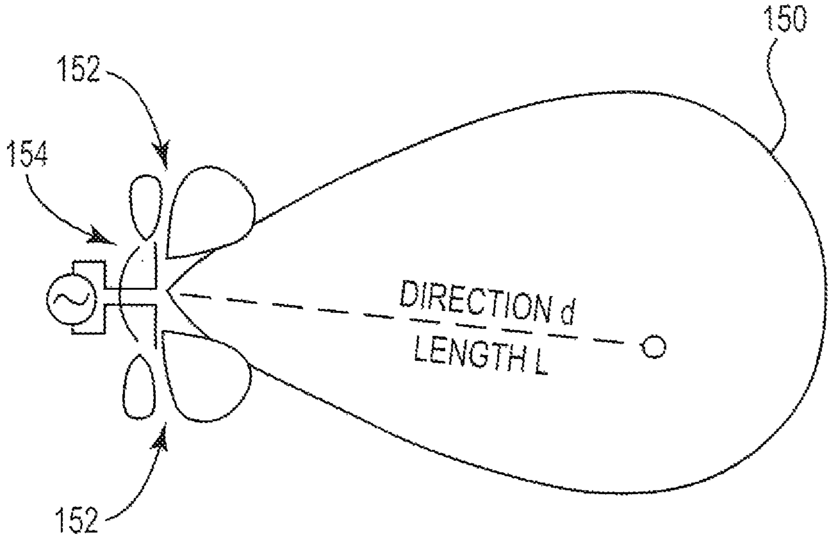
FIG. 1E shows a representative antenna pattern which includes a main lobe, side lobes, and a null.

The phased array antenna arrangement 110 comprises a plurality of antennas 112 which cooperate to create a beam of radio waves that can be electronically steered to point in a desired direction (e.g., towards a target external device 130) without moving the antennas 112. The plurality of antennas 112 can also be electronically steered to point in a desired direction when receiving radio waves from an external source 130 or to avoid external sources of interference 140. In a transmit mode, radio frequency current generated by the RF transceiver 108 is fed to the individual antennas 112 with the correct phase relationship via the phase shifters 114 so that the radio waves from the separate antennas 112 add together to increase the radiation in a desired direction, while canceling to suppress radiation in undesired directions. By changing the phase of the phase shifters 114, the processor 104 can quickly change the angle or angles of the beam and null(s) of the antenna array pattern. For example, the processor 104 can adjust the phase of the phase shifters 114 to cause the antenna array pattern to be directed at a desired angle (e.g., an azimuth angle 116 or an elevation angle 118) or angles (an azimuth angle 116 and an elevation angle 118) relative to the axis 111 of the phased array antenna arrangement 110. For purposes of illustration, a representative antenna pattern on the azimuth plane is shown in FIG. 1C. A representative antenna pattern on the elevation plane is shown in FIG. 1D. FIG. 1E shows a representative antenna pattern which includes a main lobe 150 (having a length, L, and direction, d), side lobes 152, and a null 154.

Antenna array pattern nulls are often many tens of dB, whereas peaks in antenna gain are often several dB above the average antenna gain. In environments with one or more high-power sources of RF interference 140, it may be advantageous to steer the antenna null toward one of these RF interferers 140, rather than steering the beam toward the external target device 130. Steering the antenna null toward one of these RF interferers 140 can substantially improve the signal-to-noise (SNR) ratio of the wireless link (e.g., 2.4 GHz link) with the external target device 130. Generally, however, a steering methodology that involves a combination of steering the antenna null toward an RF interferer 140 and steering the beam toward the external target device 130 (with the weighting toward reducing the noise over increasing the desired signal) is particularly useful in scenarios where the noise level is quite high.

In environments with minimal RF interference, the antenna array pattern can be steered such that the beam is directed toward the external target device 130 to increase (e.g., optimize) the SNR of the wireless link with the external target device 130. The external target device 130 can be a companion hearing device (e.g., an ear-to-ear wireless link), a device in the wearer's pocket (e.g., an ear-to-pocket wireless link), or an off-body accessory (e.g., an ear-to-off body wireless link). A several dB improvement in SNR can allow lowering of the hearing device's transmitter power, which can significantly reduce current drain, extend battery life, and/or provide for a more robust wireless link for a given transceiver power level.

Figure 2:
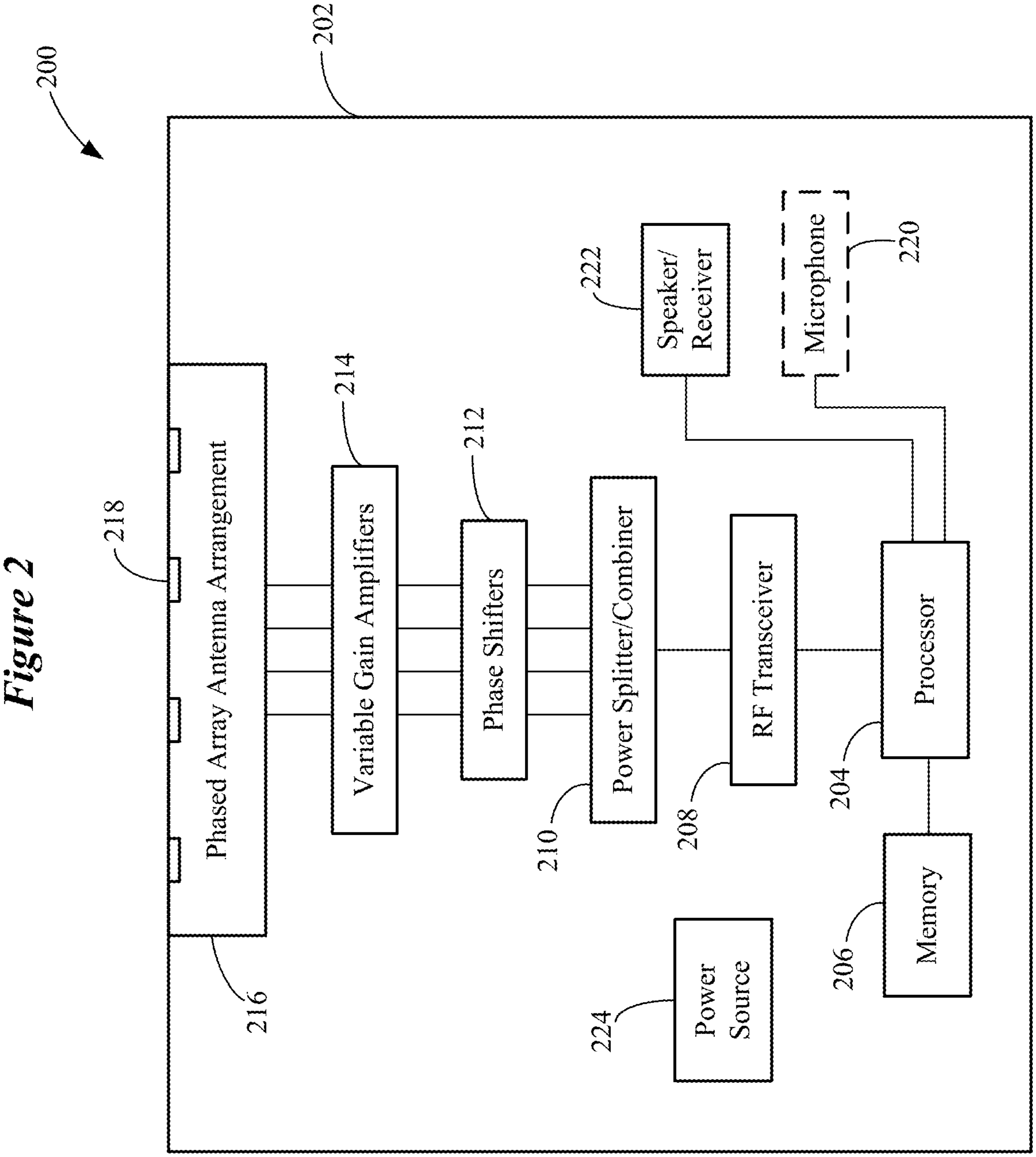
FIG. 2 illustrates a hearing device adapted to be worn at an ear of a wearer in accordance with various embodiments.

FIG. 2 illustrates a hearing device adapted to be worn at an ear of a wearer in accordance with various embodiments. The hearing device 200 shown in FIG. 2 includes a housing 202 configured to be supported at, on or in the wearer's ear. Disposed in the housing 202 is a processor 204 coupled to memory 206. The processor 204 can include or be implemented as a multi-core processor, a DSP, an audio processor or a combination of these processors. In some embodiments, the hearing device 200 includes a microphone 220, which can be a single microphone or multiple microphones (e.g., a microphone array). The microphone 220 can be coupled to a preamplifier (not shown), the output of which is coupled to the processor 204. A speaker or receiver 222 of the hearing device 200 is coupled to an amplifier (not shown) and the processor 204. The speaker or receiver 222 is configured to generate sound which is communicated to the wearer's ear. A power source 224, such as a rechargeable or conventional battery, provides power for the components of the hearing device 200.

A phased array antenna arrangement 216 is disposed in and/or on the housing 202 and coupled to an RF transceiver 208 and the processor 204. The phased array antenna arrangement 216 includes a plurality of antennas 218. The embodiment shown in FIG. 2 provides for improved phased array antenna performance by using non-uniform excitation amplitudes provided to each of the antennas 218 by individual variable gain amplifiers (VGAs) 214. In general, the processor 204 cooperates with the phase shifters 212 and the VGAs 214 to feed variable phase and amplitude to each antenna 218 of the phased array antenna arrangement 216. In some embodiments, the VGAs 214 are configured to feed different antennas 218 of the phased array antenna arrangement 216 with different power levels. The processor 204 can be configured to vary the gain of each of the VGAs 214 in a manner which reduces the side lobes of the antenna array pattern, changes the location of the side lobes, and/or changes the beam widths of the side lobes. In addition, or alternatively, the processor 204 can be configured to vary the gain of each of the VGAs 214 to modify the width of the main beam of the antenna array pattern. In addition, or alternatively, the processor 204 can be configured to vary the gain of each of the VGAs 214 to modify the null levels, locations, and widths. In some cases, the VGAs 214 can have unity gain. In other cases, the VGAs 214 can provide for attenuation of excitation amplitudes provided to each of the antennas 218.

In accordance with some embodiments, it may be desirable for the phase shifters 212 to perform their function at lower amplitudes, with the output of the phase shifters 212 being amplified by the VGAs 214 before being feed to each antenna 218. If all the gains of the VGAs 213 were equal (but greater than 1), then this approach would effectively be consistent with the phase-shift only approach shown in FIG. 1A.

In the embodiment shown in FIG. 2, the RF transceiver 208 is coupled to a power splitter/combiner 210, a plurality of phase shifters 212, a plurality of VGAs 214, and the phased array antenna arrangement 216. More particularly, the power splitter/combiner 210 includes a first port coupled to the RF transceiver 208 and a plurality of second ports each coupled to one of the phase shifters 212. Each of the phase shifters 212 is coupled to one of the VGAs 214 and one of the antennas 218 of the phased array antenna arrangement 216. The processor 204 is configured to adjust a gain of each of the VGAs 214 and the phase of each of the phase shifters 212. By controlling the gain of the VGAs 214 in conjunction with the phase of the phase shifters 212, the antenna array pattern can be electronically steered in one or both of an azimuth plane and an elevation plane (see FIG. 1B) while having its antenna excitation coefficients varied to reduce the side lobes and/or modify the width of the main beam.

Designing and implementing an antenna for hearing devices, such as hearing aids for example, is a very challenging task due to the relatively small size of such hearing devices. If packaging limitations were not a design constraint, the best spacing between antenna elements of a phased array antenna arrangement is typically $\lambda/4$ or greater (e.g., $\lambda/2$), where $\lambda$ is the wavelength of the intended signal to be transmitted and received by the phased array antenna. In the case of a phased array antenna configured to operate in the 2.4 GHz band in free-space/air, a spacing of $\lambda/2$ between the antenna elements would be about 6 cm, which is much too large for a hearing device. In order to reduce the effective wavelength of the intended signal to be transmitted and received by the phased array antenna, the phased array antenna is fabricated on high dielectric material, as is discussed with reference to the embodiment shown in FIG. 3.

Figure 3:
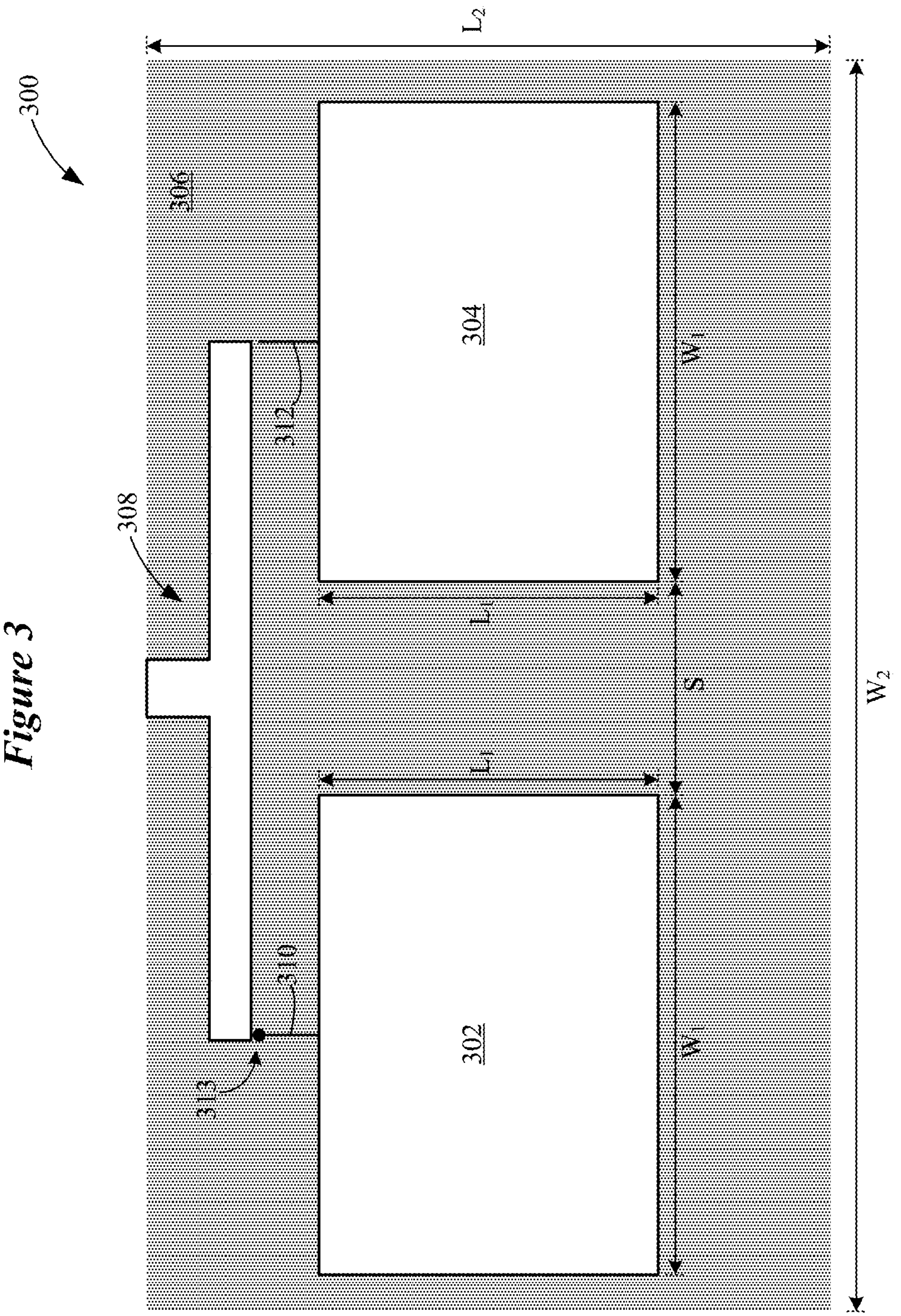
FIG. 3 illustrates a phased array antenna arrangement in accordance with various embodiments.

FIG. 3 illustrates a phased array antenna arrangement in accordance with various embodiments. In the embodiment shown in FIG. 3, the phased array antenna arrangement 300 includes two antennas 302, 304, a power splitter/combiner 308, and a feed arrangement 310, 312 disposed on a substrate 306 comprising high dielectric material. Each of the antennas 302, 304 is fed with a microstrip transmission line 310, 312. The power splitter/combiner 308 can be a Wilkinson power splitter/combiner/divider, for example. The power splitter/combiner 308 can be implemented as a lumped element or distributed on an underlying layer of the substrate 306. The power splitter/combiner 308 can be implemented with an IC-level/active-circuitry solution (e.g., multiple amplifiers from a single signal source is an active form of power-splitting). The antennas 302, 304 are implemented as patch antennas, but can be of any topology. It is understood that the phased array antenna arrangement 300 can include more than two antennas, such as up to 4, 6 or 8 antennas for example. It is also understood that a phased array antenna arrangement can include an N×M matrix of antennas, and is not limited to a linear array of antennas. The dot 313 indicates the location where phase shift and/or variable gain amplifier circuitry can be placed.

The phased array antenna arrangement 300 shown in FIG. 3 is configured to operate in the 2.4 GHz band. In order for the phased array antenna arrangement 300 to be of a size suitable for incorporation in a hearing device worn on and/or in the ear, such as a hearing aid, the substrate 306 is formed from a material having a dielectric constant of at least about 140 (e.g., ~144). A suitable material for substrate 306 is a ceramic material comprising magnesium calcium titanate. A suitable material for substrate 306 is MCT-140 available from Trans-Tech Inc., a wholly owned subsidiary of Skyworks Solutions, Inc. (Adamstown, Md.).

In FIG. 3, various dimensions of the phased array antenna arrangement 300 are shown for illustrative purposes. The dimensions L1 and W1 represent the length and width of each antenna 302, 304. The dimension S represents the spacing between each antenna 302, 304. The dimensions L2 and W2 represent the length and width of the substrate 306. According to various embodiments, the phased array antenna arrangement 300 can have the following dimensions: length L1 of about 5 mm, width W1 of about 7 mm, length L2 of about 10 mm, width W2 of about 20 mm, spacing S of about 3 mm, and the dielectric constant of the substrate 306 is at least about 140. According to one embodiment, the phased array antenna arrangement 300 has the following dimensions: L1=5.13 mm, W1=7.22 mm, L2=10.05 mm, W2=19 mm, S=3.2 mm, and the dielectric constant of the substrate 306 is about 144.

The dielectric constant requirements of the phased array antenna arrangement depend on the size of the hearing device. In a hearing aid embodiment, for example, the dielectric constant of the substrate 306 supporting the phased array antenna arrangement 300 may be very high, such as greater than about 100, 110, 120, 130, or even 140 (e.g., ~144). In some embodiments, such as earphones and various accessories, the housing of the hearing device is quite large relative to that of a hearing aid, for example. As such, the phased array antenna arrangement can be implemented on a substrate having a relatively low dielectric constant, such as about 8 or greater (e.g., less than about 40, 50, 60, 70, 80, 90 or 100).

Figure 4:
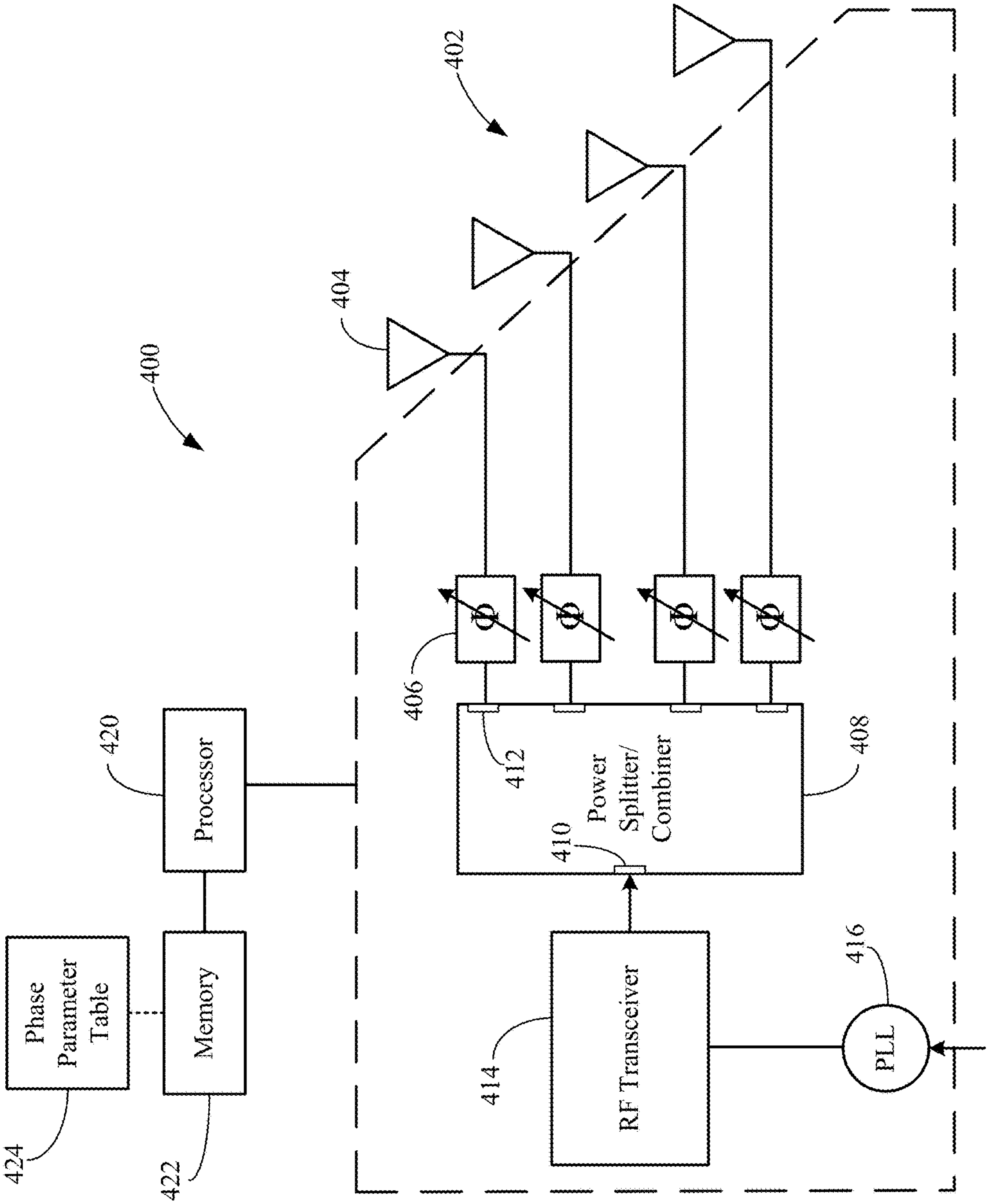
FIG. 4 illustrates circuitry of a hearing device which includes a phased array antenna arrangement in accordance with various embodiments.

FIG. 4 illustrates circuitry of a hearing device which includes a phased array antenna arrangement in accordance with various embodiments. The circuitry 400 shown in FIG. 4 includes a phased array antenna arrangement 402 comprising a plurality of antennas 404. Although four antennas 404 are shown in FIG. 4 for illustrative purposes, it is understood that the number of antennas 404 can vary, typically between two and six or eight antennas 404, for example. Each of the antennas 404 is coupled to a phase shifter 406. A power splitter/combiner 408 includes a first port 410 coupled to an RF transceiver 414 and a plurality of second ports 412. Each of the second ports 412 is coupled to a corresponding phase shifter 406. The RF transceiver 414 is coupled to a reference clock 416, such as a phase lock loop (PLL). The RF transceiver 414 can be configured to operate in the 2.4 GHz band.

Each of the phase shifters 406 is coupled to a processor 420. The phase of the phase shifters 406 is controlled by the processor 420. In some embodiments, the processor 420 is coupled to a memory 422 configured to support a phase parameter table 424. Phase parameters can be tabularized and stored electronically as a function of desired spatial steering direction in the phase parameter table 424. For example, in a linear, uniformly excited array, the main beam can be steered away the perpendicular "broadside" pattern by the same angle as the phase delay. So, if each antenna from left to right has a delay of 30 degrees, for example, the antenna array pattern will move 30 degrees down to the right. A phased-weighting scheme can be implemented by the processor 420 to steer the antenna array pattern such that the direction of maximum reception is in a desired direction.

In some embodiments, the phase parameters stored in the phase parameter table 424 can account for head-loading effects (e.g., of an average head) on the antenna array pattern. It is known that the impedance of an antenna can be substantially affected by the presence of human tissue, which degrades the antenna performance. Such effect is known as head loading and can make the performance of the antenna when the hearing device is worn (referred to as "on head performance") substantially different from the performance of the antenna when the hearing device is not worn. The phase parameters stored in the phase parameter table 424 that account for head-loading effects on the antenna array pattern can be determined during development of the hearing device and/or via a machine learning algorithm that customizes the phase parameters for each user.

The antenna array pattern (main lobe or null) can be spatially steered by the processor 420, which accesses the phase parameters stored in the phase parameter table 424. For example, the processor 420 can be configured to step through tabularized phase parameters sequentially, with the processor 420 feeding phase parameters to each of phase shifters 406. Various methodologies for steering the antenna array pattern of the phased array antenna arrangement 402 by the processor 420 are described hereinbelow.

Figure 5A:
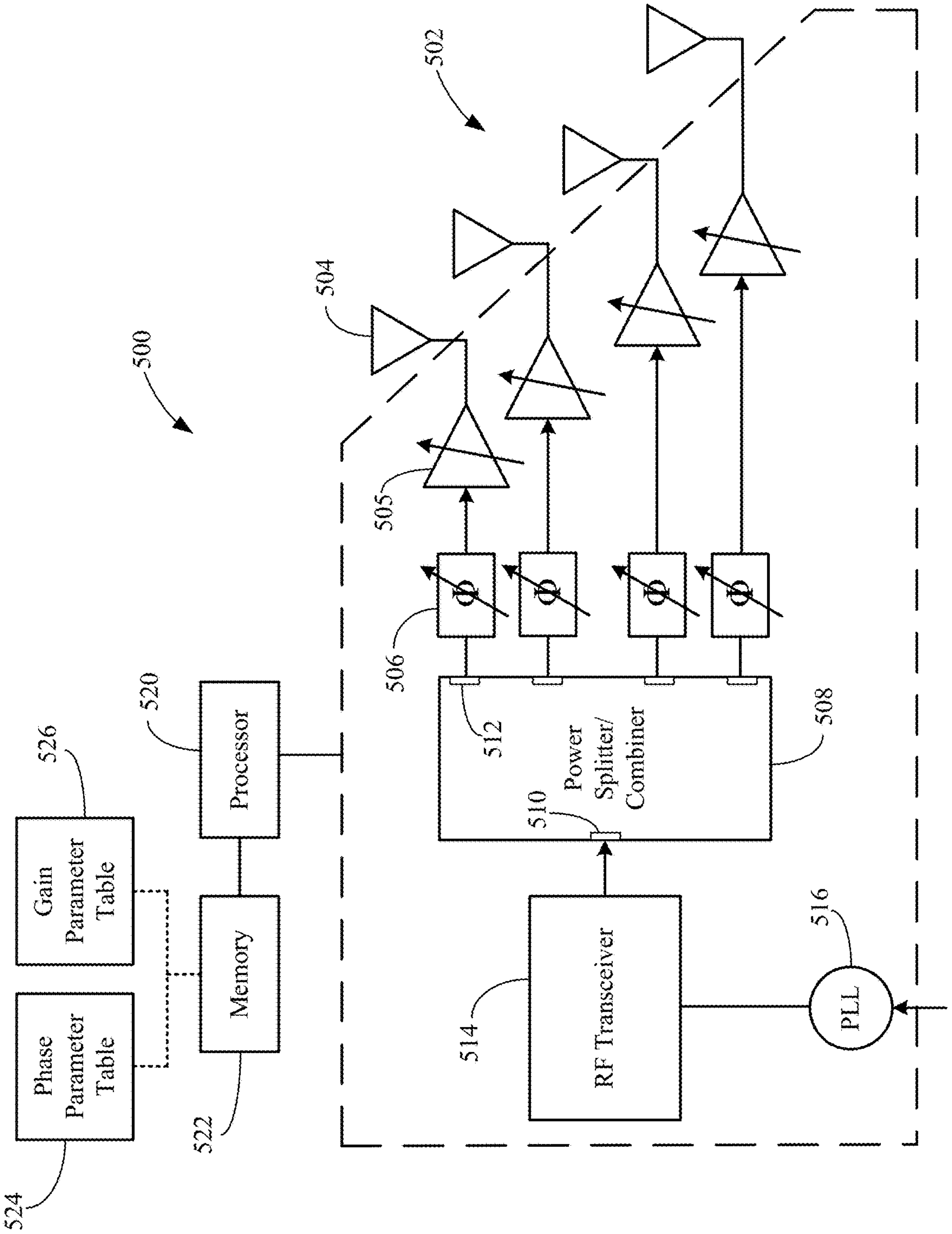
FIGS. 5A and 5B illustrate circuitry of a hearing device which includes a phased array antenna arrangement in accordance with various embodiments.
Figure 5B:
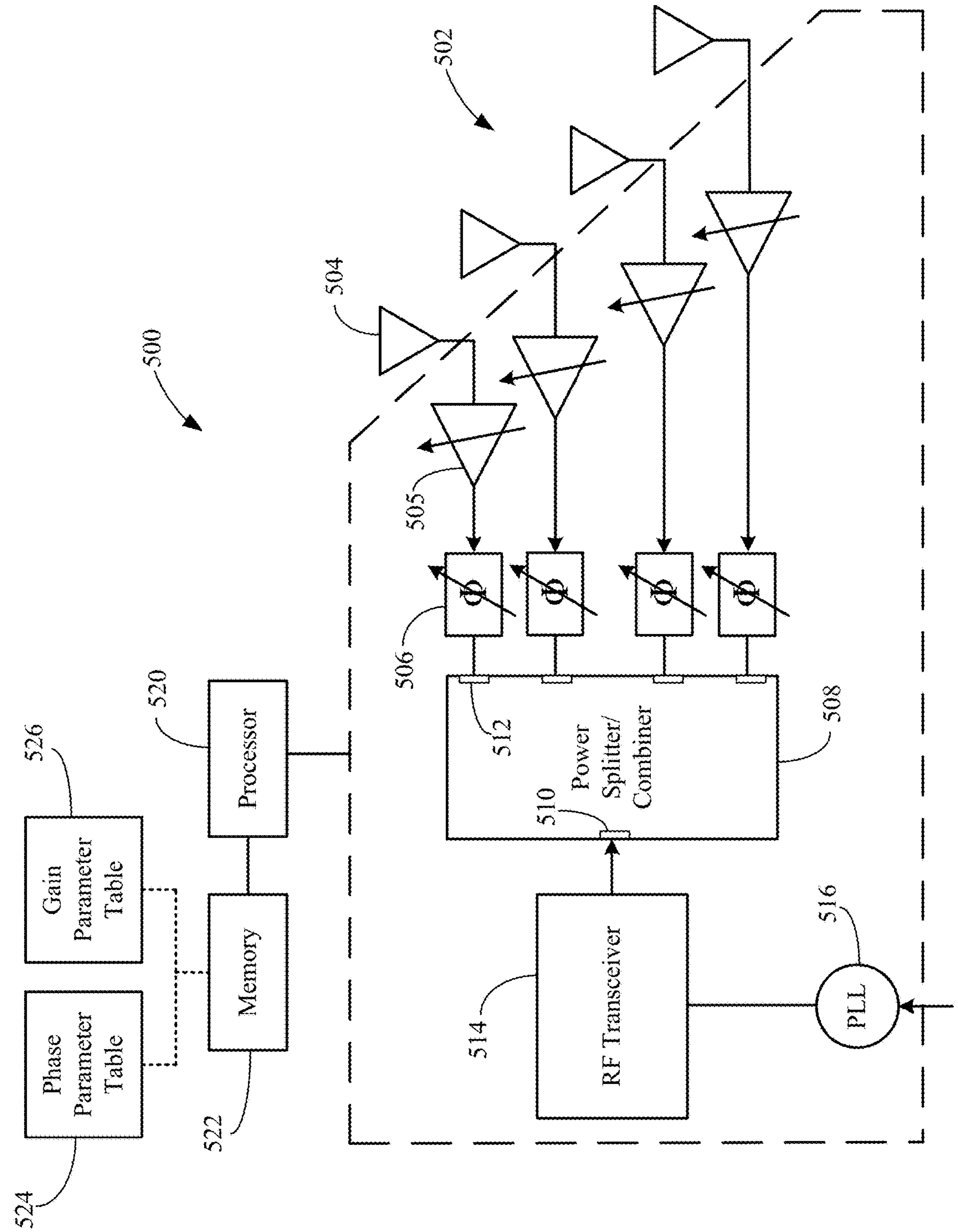

FIGS. 5A and 5B illustrate circuitry of a hearing device which includes a phased array antenna arrangement in accordance with various embodiments. FIG. 5A shows the circuitry 500 in a transmit mode, while FIG. 5B shows the circuitry 500 in a receive mode. The circuitry 500 shown in FIGS. 5A and 5B includes a phased array antenna arrangement 502 comprising a plurality of antennas 504. Although four antennas 504 are shown in FIGS. 5A and 5B for illustrative purposes, it is understood that the number of antennas 504 can vary (e.g., between 2 and 6 or 8 antennas).

Each of the antennas 504 is coupled to a VGA 505, and each VGA 505 is coupled to a phase shifter 506. As was discussed previously, non-uniform excitation amplitudes can be provided to each of the antennas 504 by controlling the gain of individual VGAs 505 by the processor 520. In some cases, the VGAs 505 can have unity gain. In other cases, the VGAs 505 can provide for attenuation of excitation amplitudes provided to each of the antennas 504. A power splitter/combiner 508 includes a first port 510 coupled to an RF transceiver 514 and a plurality of second ports 512. Each of the second ports 512 is coupled to a corresponding phase shifter 506. The RF transceiver 514 is coupled to a reference clock 516, such as a phase lock loop. The RF transceiver 514 can be configured to operate in the 2.4 GHz band.

Each of the phase shifters 506 and VGAs 505 is coupled to a processor 520. The phase of the phase shifters 506 and the gain of the VGAs 505 are controlled by the processor 520. In some embodiments, the processor 520 is coupled to a memory 522 configured to support a phase parameter table 524 and a gain parameter table 526. Phase and gain parameters can be tabularized and stored electronically as a function of desired spatial steering direction in the phase and gain parameter tables 524, 526. In some embodiments, the phase and gain parameters stored in the phase and gain parameter tables 524, 526 can account for head-loading effects (e.g., of an average head) on the antenna array pattern. The antenna array pattern (main lobe or null) can be spatially steered by the processor 520, which accesses the phase and gain parameters stored in the phase and gain parameter tables 524, 526. For example, the processor 520 can be configured to step through tabularized phase and gain parameters sequentially, with the processor 520 feeding phase parameters to each of phase shifters 506 and gain parameters to each of the VGAs 505. As was discussed previously, the processor 520 can be configured to feed phase parameters to the phase shifters 506 to steer the antenna array pattern in a desired direction, and feed gain parameters to the VGAs 505 to modify the width of the main beam, modify one or more of a magnitude, location, and beam width of the side lobes, and/or modify the null levels, locations, and widths. Various methodologies for steering the antenna array pattern of the phased array antenna arrangement 502 by the processor 520 are described hereinbelow.

Figure 5C:
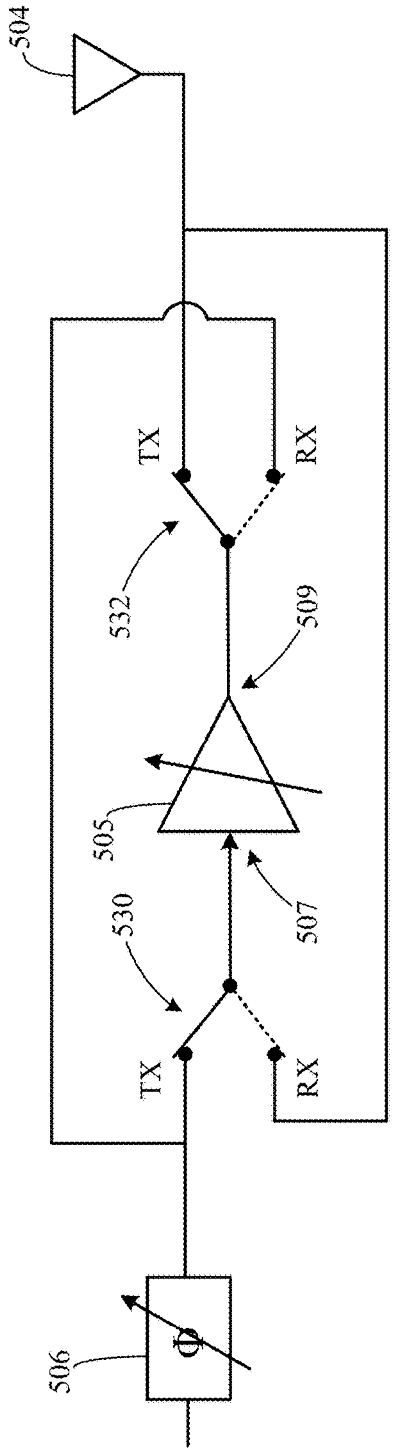
FIG. 5C is a block diagram of a variable gain amplifier shown in FIGS. 5A and 5B with accompanying switching circuitry in accordance with various embodiments.

FIG. 5C is a block diagram of a VGA 505 shown in FIGS. 5A and 5B with accompanying switching circuitry in accordance with various embodiments. The VGA circuitry shown in FIG. 5C allows the VGA 505 to function in both a transmit mode and a receive mode by the addition of switching circuitry. The switching circuitry includes a first switch 530 coupled to an input 507 of the VGA 505 and a second switch 532 coupled to an output 509 of the VGA 505. The first switch 530 is coupled to a phase shifter 506, and the second switch 532 is coupled to an antenna 504. The first and second switches 530, 532 can be implemented as single-pole-double-throw (SPDT) RF switches. As shown, the first and second switches 530, 532 are set for operation in a transmit mode. In a receive mode, the first and second switches 530, 532 would be set for operation as indicated by the dashed lines.

In a transmit (TX) mode, RF signals pass from the phase shifter 506 to the TX throw of the first switch 530, and from the pole of the first switch 530 to the input 507 of the VGA 505. Variable gain is applied to the RF signals passing through the VGA 505. The RF signals pass from the output 509 of the VGA 505 to the pole of the second switch 532, and from the TX throw of the second switch 532 to the antenna 504. In the receive (RX) mode, RF signals are communicated from the antenna 504 to the RX throw of the first switch 530, and from the pole of the first switch 530 to the input 507 of the VGA 505. Variable gain is applied to the RF signals passing through the VGA 505. The RF signals pass from the output 509 of the VGA 505 to the pole of the second switch 532, and from the RX throw of the second switch 532 to the phase shifter 506.

Figure 5D:
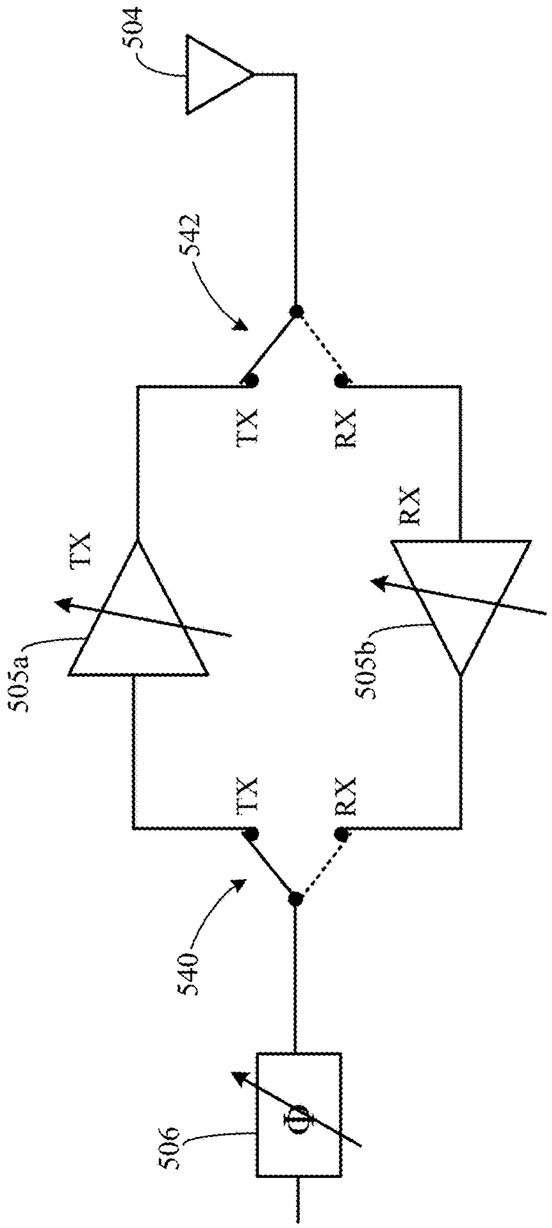
FIG. 5D is a block diagram of a variable gain amplifier arrangement with accompanying switching circuitry for use in the hearing device shown in FIGS. 5A and 5B in accordance with various embodiments.

FIG. 5D is a block diagram of a VGA arrangement with accompanying switching circuitry for use in the hearing device circuitry shown in FIGS. 5A and 5B in accordance with various embodiments. The switching circuitry include a first switch 540 having a pole coupled to a phase shifter 506, a TX throw coupled to an input of a first VGA 505*a*, and an RX throw coupled to an output of a second VGA 505*b*. The switching circuitry also includes a second switch 542 having a pole coupled to an antenna 504, a TX throw coupled to an output of the first VGA 505*a*, and an RX throw coupled to an input of the second VGA 505*b*. In the embodiment shown in FIG. 5D, the first VGA 505*a* is used during a transmit mode, and the second VGA 505*b* is used during the receive mode. The first VGA 505*a* is preferably designed for efficiency and high power output. The second VGA 505*b* is preferably a Low Noise Amplifier (LNA). The relative gains can be set similarly for both the first and second VGAs 505*a*, 505*b* (relative to gains of other pairs of first and second VGAs 505*a*, 505*b* of the hearing device circuitry shown in FIGS. 5A and 5B).

Figure 6:
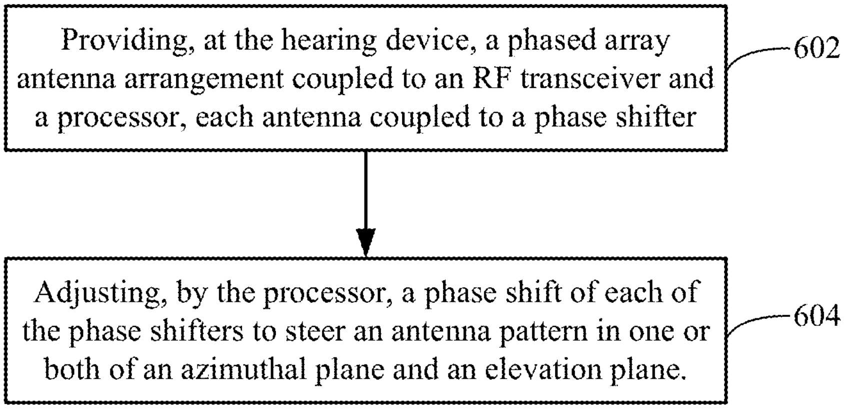
FIG. 6 illustrates a method of operating a phased array antenna arrangement of a hearing device in accordance with various embodiments.

FIG. 6 illustrates a method of operating a phased array antenna arrangement of a hearing device in accordance with various embodiments. The method shown in FIG. 6 involves providing 602, at the hearing device, a phased array antenna arrangement coupled to an RF transceiver and a processor. The phased array antenna arrangement comprises a plurality of antennas each coupled to one of a plurality of phase shifters. The method also involves adjusting 604, by the processor, a phase shift of each of the phase shifters to steer an antenna array pattern, such as in one or both of an azimuth plane and an elevation plane.

Figure 7:
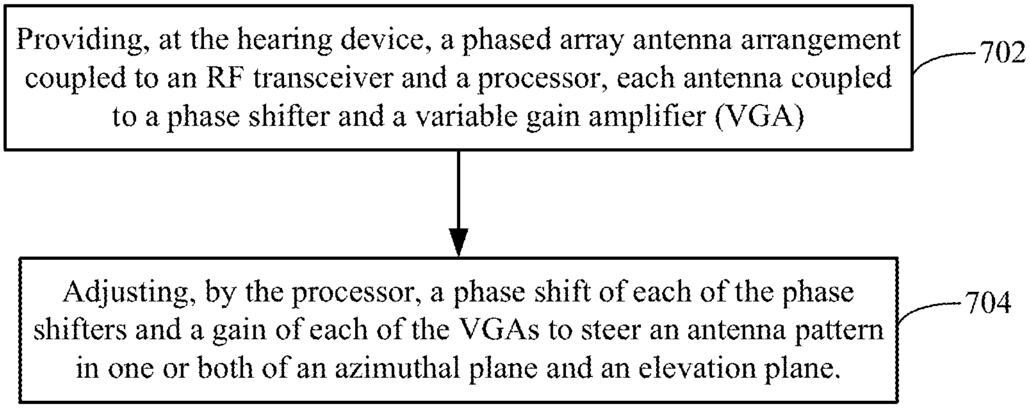
FIG. 7 illustrates a method of operating a phased array antenna arrangement of a hearing device in accordance with various embodiments.

FIG. 7 illustrates a method of operating a phased array antenna arrangement of a hearing device in accordance with various embodiments. The method shown in FIG. 7 involves providing 702, at the hearing device, a phased array antenna arrangement coupled to an RF transceiver and a processor.

The phased array antenna arrangement comprises a plurality of antennas each coupled to one of a plurality of phase shifters and one of a plurality of VGAs. The method also involves adjusting 704, by the processor, a phase shift of each of the phase shifters and a gain of each of the VGAs to steer an antenna array pattern, such as in one or both of an azimuth plane and an elevation plane. In some embodiments, the method shown in FIG. 7 may involve varying the gain of each of the VGAs in a manner which reduces the side lobes of the antenna array pattern and/or modifies the width of the main beam of the antenna array pattern.

Figure 8:
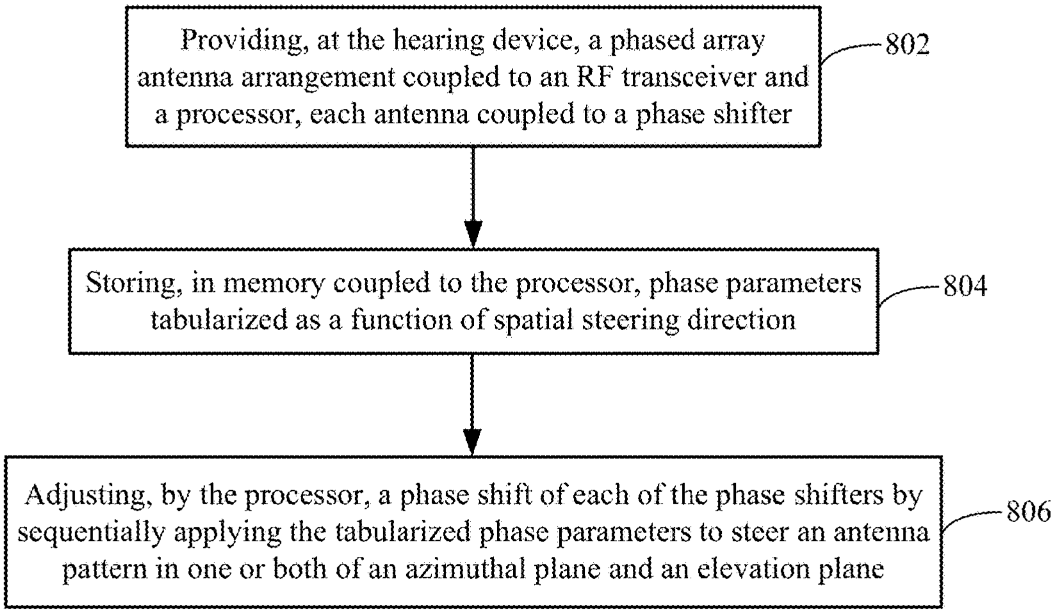
FIG. 8 illustrates a method of operating a phased array antenna arrangement of a hearing device in accordance with various embodiments.

FIG. 8 illustrates a method of operating a phased array antenna arrangement of a hearing device in accordance with various embodiments. The method shown in FIG. 8 involves providing 802, at the hearing device, a phased array antenna arrangement coupled to an RF transceiver and a processor. The phased array antenna arrangement comprises a plurality of antennas each coupled to one of a plurality of phase shifters. The method also involves storing 804, in memory coupled to the processor, phase parameters tabularized as a function of spatial steering direction. The method further involves adjusting 804, by the processor, a phase shift of each of the phase shifters by sequentially applying the tabularized phase parameters to steer an antenna array pattern, such as in one or both of an azimuth plane and an elevation plane.

Figure 9:
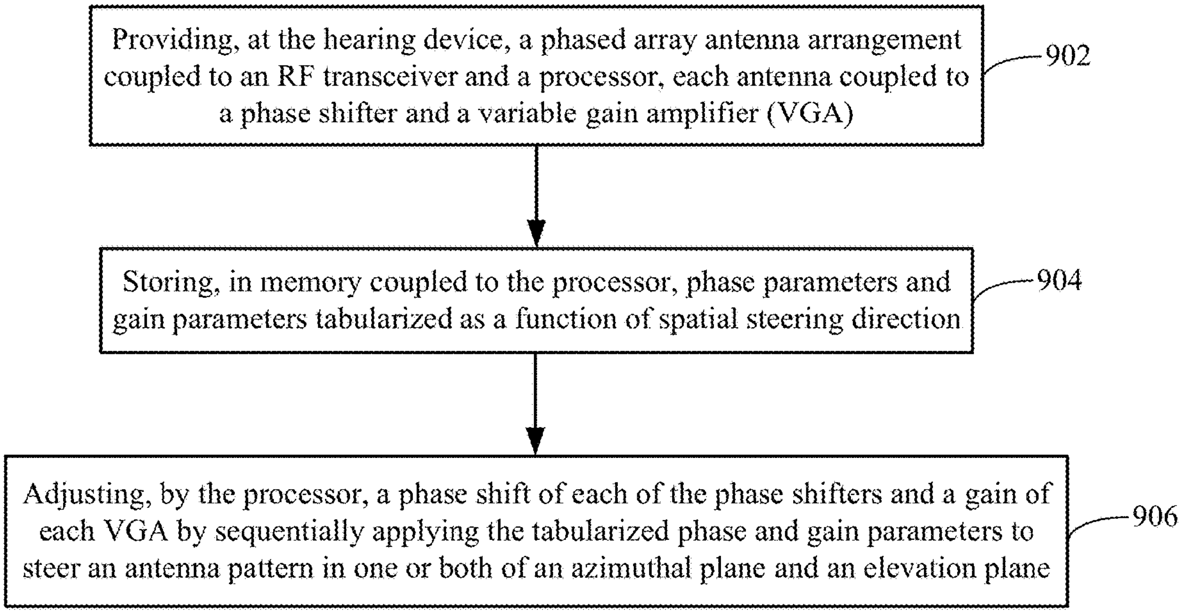
FIG. 9 illustrates a method of operating a phased array antenna arrangement of a hearing device in accordance with various embodiments.

FIG. 9 illustrates a method of operating a phased array antenna arrangement of a hearing device in accordance with various embodiments. The method shown in FIG. 9 involves providing 902, at the hearing device, a phased array antenna arrangement coupled to an RF transceiver and a processor. The phased array antenna arrangement comprises a plurality of antennas each coupled to one of a plurality of phase shifters and one of a plurality of VGAs. The method also involves storing 904, in memory coupled to the processor, phase parameters and gain parameters tabularized as a function of spatial steering direction. The method further involves adjusting 904, by the processor, a phase shift of each of the phase shifters and a gain of each of the VGAs by sequentially applying the tabularized phase and gain parameters to steer an antenna array pattern, such as in one or both of an azimuth plane and an elevation plane. In some embodiments, the method shown in FIG. 9 may involve varying the gain of each of the VGAs in a manner which reduces the side lobes of the antenna array pattern and/or modifies the width of the main beam of the antenna array pattern.

Figure 10:
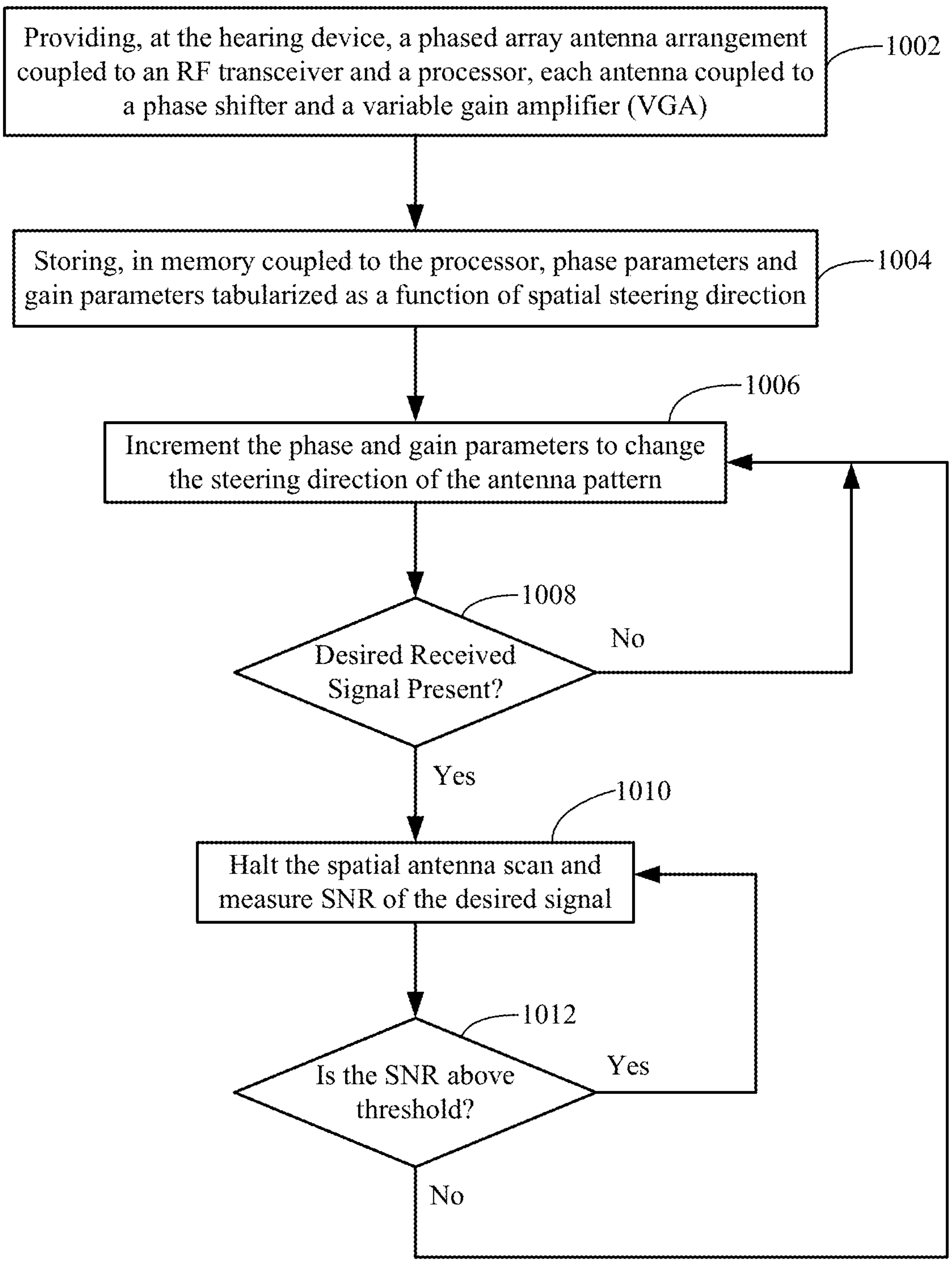
FIG. 10 illustrates a method of operating a phased array antenna arrangement of a hearing device in accordance with various embodiments.

FIG. 10 illustrates a method of operating a phased array antenna arrangement of a hearing device in accordance with various embodiments. The method shown in FIG. 10 involves providing 1002, at the hearing device, a phased array antenna arrangement coupled to an RF transceiver and a processor. The phased array antenna arrangement comprises a plurality of antennas each coupled to one of a plurality of phase shifters and one of a plurality of VGAs. The method involves storing 1004, in memory coupled to the processor, phase parameters and gain parameters tabularized as a function of spatial steering direction. The method also involves incrementing 1006 the phase and gain parameters to change the steering direction of the antenna array pattern.

A check 1008 is made to determine if the desired received signal is present. If not, the phase and gain parameters are incremented 1006 to change the steering direction of the antenna array pattern. If the desired received signal is present 1008, the spatial antenna scan is halted 1010 and the SNR of the desired signal is measured. A check 1012 is made to determine if the SNR of the desired received signal is above a threshold. The threshold can be established based on the transceiver's modulation type/protocol and the use-case for the data sent/received. Each transceiver's modulation type/protocol and the use-case for the data sent/received will determine the bit error rate (BER) required for proper system performance. This BER has an associated SNR. For an FSK system, for example, typically a 12 dB to 14 dB SNR would be a suitable SNR. The threshold could be set for this SNR level. In other implementations, a suitable SNR threshold may be 3 dB. If above the threshold, the current steering direction of the antenna array pattern is maintained and the SNR of the desired received signal is measured 1010. If the SNR of the desired received signal is below the threshold 1012, the phase and gain parameters are incremented to change the steering direction of the antenna array pattern 1006. The processes of blocks 1006-1012 are repeated to steer the antenna array pattern in a direction that increases or maximizes the SNR of the desired received signal.

According to various embodiments, the antenna array pattern of a phased array antenna arrangement of a hearing device can be spatially steered by a processor of the device to increase or maximize the SNR of a received signal of interest. For example, an RSSI (Received Signal Strength Indicator) measurement can be made by the processor of the hearing device without a signal present (e.g., on-channel receives noise). An RSSI measurement can be made by the processor with the desired signal present. The processor can calculate the SNR of the desired signal. Various methodologies can be implemented by the processor of the hearing device to maintain adequate SNR of the desired received signal. Four example embodiments for steering an antenna array pattern of a phased array antenna arrangement of a hearing device are summarized below. Additionally or alternatively, even if the SNR threshold is significantly exceeded for a given/selected phased array antenna steering direction, the direction could be slightly dithered in multiple directions to find a local maximum of SNR, all the while operating without error in the TX/RX output.

Example 1

A spatial antenna scan is performed and the SNR of the desired received signal is measured incrementally as a function of spatial directions of the desired received signal, such as in a manner discussed previously. The phased array antenna array pattern can be steered to the direction of the centroid of measured directions which yields an adequate SNR (e.g., an SNR above a preset threshold). This antenna array pattern direction is maintained until the SNR falls below the threshold, at which point the scan and SNR measurement process is repeated.

Example 2

According to this example embodiment, the methodology of Example 1 is performed in a successive approximation manner for faster operation. According to this example, gross directional resolution sampling of the SNR of the desired received signal is performed, followed by successively reducing the resolution of the spatial steering/sampling. A spatially coarse (quick) sampling of the SNR can be subsequently refined by operating on the highest SNR sampled direction, while moving halfway over to adjacent spatial directions (e.g., effectively doubling the spatial resolution in the area about the maximum) while operating the transceiver-to-transceiver data all the while. This process further involves moving to the new maximum and repeating the refinement procedure.

Example 3

According to this example embodiment, if the measured SNR of the desired received signal at the currently steered spatial direction is above a threshold (e.g., a pre-set threshold), the antenna array pattern direction is maintained. If the measured SNR of the desired received signal at the currently steered spatial direction is below the threshold, a spatial antenna scan is performed as previously described (e.g., by incrementing or decrementing the spatial directions in a sequential manner) until an SNR of the desired received signal is measured above the threshold. A local versus global region of acceptable SNR may be chosen with this example embodiment. While not optimal, the steering methodology of this example embodiment is faster than other example embodiments while still providing an adequate SNR of the desired received signal.

Example 4

This example embodiment provides a methodology for steering a phased array antenna arrangement for frequency hop systems. According to this example embodiment, any of the embodiments of Examples 1-3 can be performed on a per channel frequency basis, with the antenna array pattern "hopping"/steering with each channel frequency. This example embodiment is particularly useful for mitigating multipath effects. For example, a dynamic antenna array pattern adjustment can be performed on each Bluetooth-like hop frequency to maximize SNR as needed for each frequency. This can be performed as part of an advanced adaptive frequency hopping (AFH) methodology.

Figure 11:
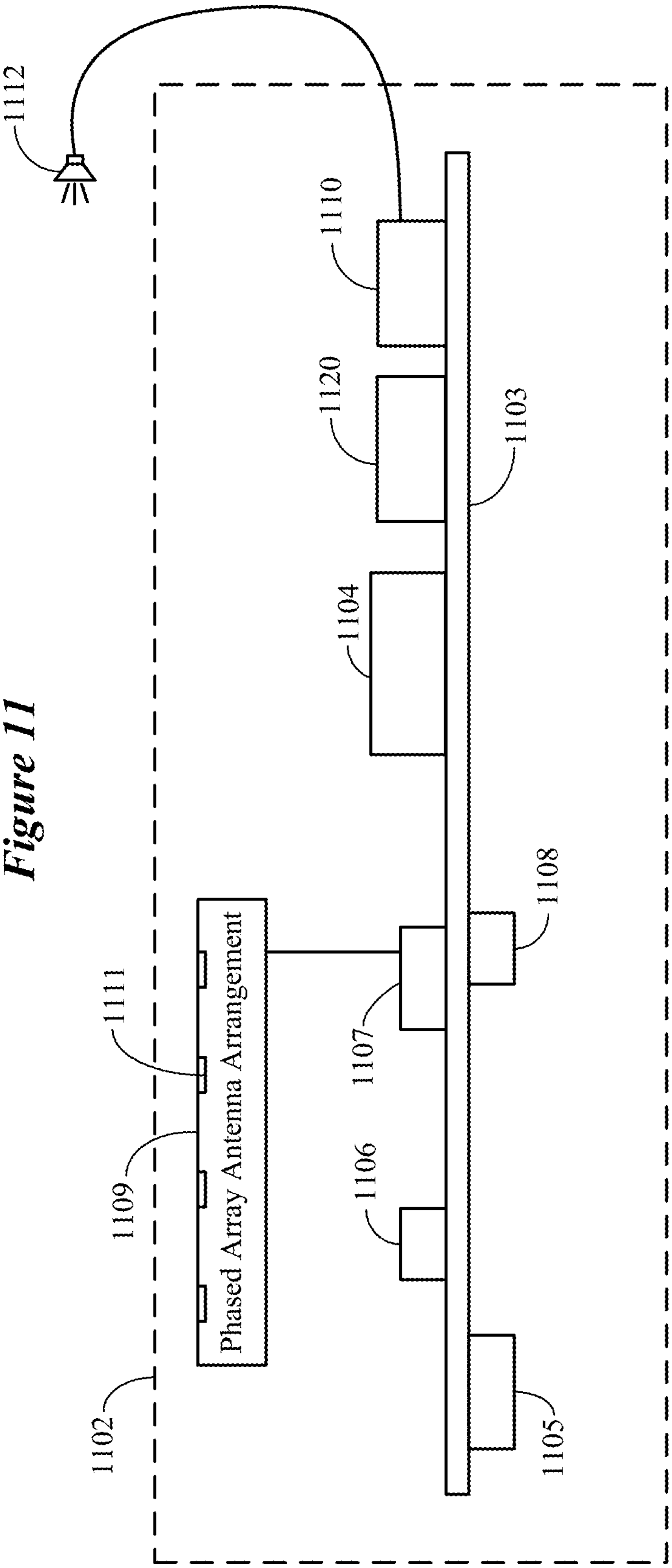
FIG. 11 is a block diagram showing various components of a hearing device which incorporates a phased array antenna arrangement in accordance with various embodiments.

FIG. 11 is a block diagram showing various components of a hearing device that incorporates a phased array antenna arrangement in accordance with various embodiments. The block diagram of FIG. 11 represents a generic hearing device 1102 for purposes of illustration. It is understood that the hearing device 1102 may exclude some of the components shown in FIG. 11 and/or include additional components. It is also understood that the hearing device 1102 illustrated in FIG. 11 can be either a right ear-worn device or a left-ear worn device. The components of the right and left ear-worn devices can be the same or different.

The hearing device 1102 shown in FIG. 11 includes several components electrically connected to a mother flexible circuit 1103. A battery 1105 is electrically connected to the mother flexible circuit 1103 and provides power to the various components of the hearing device 1102. One or more microphones 1106 are electrically connected to the mother flexible circuit 1103, which provides electrical communication between the microphones 1106 and a digital signal processor (DSP) 1104. Among other components, the DSP 1104 can incorporate or is coupled to audio signal processing circuitry. In some embodiments, a sensor arrangement 1120 (e.g., a physiologic or motion sensor) is coupled to the DSP 1104 via the mother flexible circuit 1103. One or more user switches 1108 (e.g., on/off, volume, mic directional settings) are electrically coupled to the DSP 1104 via the flexible mother circuit 1103.

An audio output device 1110 is electrically connected to the DSP 1104 via the flexible mother circuit 1103. In some embodiments, the audio output device 1110 comprises a speaker (coupled to an amplifier). In other embodiments, the audio output device 1110 comprises an amplifier coupled to an external receiver 1112 adapted for positioning within an ear of a wearer. The hearing device 1102 incorporates a communication device 1107 coupled to the flexible mother circuit 1103 and to an antenna 1109 directly or indirectly via the flexible mother circuit 1103. The antenna 1109 is implemented as a phased array antenna arrangement comprising a plurality of antennas 1111. Although not shown in FIG. 11, each of the antennas 1111 is coupled to a phase shifter and, in some embodiments, to a VGA. The communication device 1107 can be a Bluetooth® transceiver, such as a BLE (Bluetooth® low energy) transceiver or other transceiver (e.g., an IEEE 802.11 compliant device). The communication device 1107 can be configured to communicate with one or more external devices, such as those discussed previously, in accordance with various embodiments.

A hearing device which incorporates a phased array antenna arrangement can be implemented to provide electronic steering of an antenna array pattern for wirelessly communicating with a variety of external devices located at a variety of positions relative to the hearing device. For example, the external device can be located in the wearer's hand, in a pocket of a garment worn by the wearer, or at a position spaced apart from the wearer's body. The external device can be a smartphone, which may be in the wearer's hand, in a pocket, or off body, and the hearing device can be configured to receive audio and/or streaming data from the smartphone. The external device can be a remote microphone, which may be on or off body, and the hearing device can be configured to receive and/or stream data to/from the remote microphone. The external device may be a TV streamer located off body, and the hearing device can be configured to receive audio from the TV streamer. The external device can be a remote control, which may be located on or off body, and the hearing device can be configured to transmit and receive streaming data to/from the remote control. The external device can be a multi-functional accessory (e.g., a wireless bridge between the hearing device(s) and another wireless device(s), such as a smartphone or TV/audio streamer), which may be located on or off body, and the hearing device can be configured to stream audio and/or data to/from the multi-functional accessory. The external device can be a second hearing device worn by the wearer, and a first hearing device can be configured to stream audio and/or data one-way from the first hearing device to the second hearing device. In some embodiments, the first and second hearing devices can be configured to stream two-way audio and/or data between the two hearing devices.

According to various embodiments, an accessory for a hearing device can incorporate a phased array antenna arrangement of the present disclosure. Representative accessory devices include an assistive listening system, a media (e.g., TV) streamer, a radio, a smartphone, a laptop, a cell phone/entertainment device (CPED), a remote control, a remote microphone, or other electronic device that serves as a source of digital audio data or other types of data files. Representative accessory devices also include a multi-functional accessory. One example of a multi-functional accessory is configured to translate one physical layer/protocol to another physical layer/protocol. For example, a hearing device (e.g., hearing aids) may be configured to communicate via a custom 900 MHz wireless protocol or a 2.4 GHz proprietary wireless protocol. However, the wearer of the hearing device may wish to wirelessly communicate with an external device (e.g., a smartphone) that communicates via a Classic Bluetooth® protocol. The multi-functional accessory can be configured to effect translation between the custom 900 MHz or 2.4 GHz proprietary wireless protocol and the Classic Bluetooth® protocol, thereby facilitating bi-directional wireless communication between the hearing device and the external device.

The device 100, 200 shown in FIGS. 1A, 2 can represent any of the accessory devices disclosed herein. The accessory device can include some or all the components shown in FIGS. 1A and 2, and may also include one or more additional components. The accessory device may exclude one or more of the components shown in FIGS. 1A and 2. The processor of the accessory device 100, 200 can be configured to electronically steer an antenna array pattern of the phased array antenna arrangement in a manner disclosed hereinabove (e.g., see FIGS. 6-10 and accompanying text).

This document discloses numerous embodiments, including but not limited to the following:

Item 1 is a hearing device adapted to be worn at, on or in an ear of a wearer, the hearing device comprising:

a housing configured to be supported at, on or in the wearer's ear;

a processor coupled to memory, the processor and memory disposed in the housing;

a radiofrequency transceiver coupled to the processor and disposed in the housing; and a phased array antenna arrangement disposed in or on the housing and coupled to the transceiver and the processor, the phased array antenna arrangement comprising a plurality of antennas each coupled to one of a plurality of phase shifters, the processor configured to adjust a phase shift of each of the phase shifters to steer an antenna array pattern.

Item 2 is the hearing device of item 1, wherein the phased array antenna arrangement comprises a power splitter/combiner comprising a first port coupled to the transceiver and a plurality of second ports each coupled to one of the phase shifters.

Item 3 is the hearing device of item 1, wherein the processor is configured to steer a main lobe of the antenna array pattern in a direction of a desired radiofrequency signal source that increases or maximizes a signal-to-noise ratio of a radiofrequency signal received from the radiofrequency signal source.

Item 4 is the hearing device of item 1, wherein the processor is configured to steer a main lobe of the antenna array pattern in a direction that increases or maximizes a signal-to-noise ratio of a received radiofrequency signal on a per channel frequency basis.

Item 5 is the hearing device of item 1, wherein the processor is configured to steer the antenna array pattern in a direction that increases or maximizes a signal-to-noise ratio of a received radiofrequency signal while concurrently nulling a radiofrequency noise source or a multipath null contributor.

Item 6 is the hearing device of item 1, wherein:

the memory is configured to store phase parameters tabularized as a function of spatial steering direction; and the processor is configured to adjust the phase shift of each of the phase shifters by sequentially applying the tabularized phase parameters.

Item 7 is the hearing device of item 6, wherein the phase parameters stored in the memory account for head-loading effects on the antenna array pattern.

Item 8 is the hearing device of item 1, wherein each of the antennas is disposed on a substrate having a dielectric constant of at least about 100.

Item 9 is the hearing device of item 1, wherein the transceiver and the phased array antenna arrangement are configured to transmit and receive radiofrequency signals within a 2.4 GHz ISM frequency band.

Item 10 is a hearing device adapted to be worn at, on or in an ear of a wearer, the hearing device comprising:

a housing configured to be supported at, on or in the wearer's ear;

a processor coupled to memory, the processor and memory disposed in the housing;

a radiofrequency transceiver coupled to the processor and disposed in the housing; and a phased array antenna arrangement disposed in or on the housing and coupled to the transceiver and the processor, the phased array antenna arrangement comprising a plurality of antennas each coupled to one of a plurality of phase shifters and at least one of a plurality of variable gain amplifiers, the processor configured to adjust a phase shift of each of the phase shifters to steer an antenna array pattern, the processor further configured to adjust a gain of each of the variable gain amplifiers to one or more of reduce a side lobe of the antenna array pattern, change a location of the side lobe, and adjust a width of a main lobe of the antenna array pattern.

Item 11 is the hearing device of item 10, the memory is configured to store phase and gain parameters tabularized as a function of spatial steering direction; and the processor is configured to adjust the phase shift of each of the phase shifters and a gain of each of the variable gain amplifiers by sequentially applying the tabularized phase and gain parameters.

Item 12 is the hearing device of item 11, wherein the phase and gain parameters stored in the memory account for head-loading effects on the antenna array pattern.

Item 13 is the hearing device of item 10, wherein the processor is configured to steer the main lobe of the antenna array pattern in a direction of a desired radiofrequency signal source that increases or maximizes a signal-to-noise ratio of a radiofrequency signal received from the radiofrequency signal source.

Item 14 is the hearing device of item 10, wherein the processor is configured to steer the main lobe of the antenna array pattern in a direction that increases or maximizes a signal-to-noise ratio of a received radiofrequency signal on a per channel frequency basis.

Item 15 is the hearing device of item 10, wherein the processor is configured to steer the antenna array pattern in a direction that increases or maximizes a signal-to-noise ratio of a received radiofrequency signal while concurrently nulling a radiofrequency noise source or a multipath null contributor.

Item 16 is the hearing device of item 10, wherein each of the antennas is disposed on a substrate having a dielectric constant of at least about 100.

Item 17 is the hearing device of item 10, wherein the transceiver and the phased array antenna arrangement are configured to transmit and receive radiofrequency signals within a 2.4 GHz ISM frequency band.

Item 18 is a method implemented by a hearing device adapted to be worn at, on or in an ear of a wearer, the method comprising:

providing, at the hearing device, a phased array antenna arrangement coupled to a radiofrequency transceiver and a processor, the phased array antenna arrangement comprising a plurality of antennas each coupled to one of a plurality of phase shifters; and adjusting, by the processor, a phase shift of each of the phase shifters to steer an antenna array pattern.

Item 19 is the method of item 18, wherein:

the phased array antenna arrangement comprises a plurality of variable gain amplifiers each coupled to one of the plurality of phase shifters and one of the plurality of antennas; and the method comprises:

adjusting, by the processor, the phase shift of each of the phase shifters to steer the antenna array pattern; and adjusting, by the processor, a gain of each of the variable gain amplifiers to one or more of reduce a side lobe of the antenna array pattern, change a location of the side lobe, and adjust a width of a main lobe of the antenna array pattern.

Item 20 is the method of item 18, wherein steering the antenna array pattern comprises steering a main lobe of the antenna array pattern in a direction that increases or maximizes a signal-to-noise ratio of a received radiofrequency signal.

Item 21 is the method of item 18, wherein steering the antenna array pattern comprises steering a main lobe of the antenna array pattern in a direction that increases or maximizes a signal-to-noise ratio of a received radiofrequency signal on a per channel frequency basis.

Item 22 is the method of item 18, wherein steering the antenna array pattern comprises steering the antenna array pattern in a direction that increases or maximizes a signal-to-noise ratio of a received radiofrequency signal while concurrently nulling a radiofrequency noise source or a multipath null contributor.

Item 23 is the method of item 18, comprising:

storing, in memory coupled to the processor, phase parameters tabularized as a function of spatial steering direction; and adjusting the phase shift comprises adjusting the phase shift of each of the phase shifters by sequentially applying the tabularized phase parameters.

Item 24 is the method of item 18, wherein:

the phased array antenna arrangement comprises a plurality of variable gain amplifiers each coupled to one of the plurality of phase shifters and one of the plurality of antennas; and the method comprises:

storing, in memory coupled to the processor, phase and gain parameters tabularized as a function of spatial steering direction; and adjusting the phase shift of each of the phase shifters and a gain of each of the variable gain amplifiers by sequentially applying the tabularized phase and gain parameters.

Item 25 is the method of item 18, comprising transmitting and receiving radiofrequency signals communicated on a per channel basis via the phased array antenna arrangement.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of" and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A hearing device adapted to be worn at, on or in an ear of a wearer, the hearing device comprising:

a housing configured to be supported at, on or in the wearer's ear;

a memory configured to store phase parameters tabularized as a function of spatial steering direction;

a processor coupled to the memory, the processor and memory disposed in the housing;

a radiofrequency transceiver coupled to the processor and disposed in the housing; and a phased array antenna arrangement disposed in or on the housing and coupled to the transceiver and the processor, the phased array antenna arrangement comprising a plurality of phase shifters and a plurality of antennas each coupled to one of the phase shifters, the processor configured to adjust a phase shift of each of the phase shifters to steer an antenna array pattern by sequentially applying the tabularized phase parameters.

2. The hearing device of claim 1, wherein the phased array antenna arrangement comprises a power splitter/combiner comprising a first port coupled to the transceiver and a plurality of second ports each coupled to one of the phase shifters.

3. The hearing device of claim 1, wherein the processor is configured to steer a main lobe of the antenna array pattern in a direction of a desired radiofrequency signal source that increases or maximizes a signal-to-noise ratio of a radiofrequency signal received from the radiofrequency signal source.

4. The hearing device of claim 1, wherein the processor is configured to steer a main lobe of the antenna array pattern in a direction that increases or maximizes a signal-to-noise ratio of a received radiofrequency signal on a per channel frequency basis.

5. The hearing device of claim 1, wherein the processor is configured to steer the antenna array pattern in a direction that increases or maximizes a signal-to-noise ratio of a received radiofrequency signal while concurrently nulling a radiofrequency noise source or a multipath null contributor.

6. The hearing device of claim 1, wherein the phase parameters stored in the memory account for head-loading effects on the antenna array pattern.

7. The hearing device of claim 1, wherein each of the antennas is disposed on a substrate having a dielectric constant of at least about 100.

8. The hearing device of claim 1, wherein the transceiver and the phased array antenna arrangement are configured to transmit and receive radiofrequency signals within a 2.4 GHz ISM frequency band.

9. A hearing device adapted to be worn at, on or in an ear of a wearer, the hearing device comprising:

a housing configured to be supported at, on or in the wearer's ear;

a memory configured to store phase parameters tabularized as a function of spatial steering direction a processor coupled to the memory, the processor and memory disposed in the housing;

a radiofrequency transceiver coupled to the processor and disposed in the housing; and a phased array antenna arrangement disposed in or on the housing and coupled to the transceiver and the processor, the phased array antenna arrangement comprising a plurality of phase shifters, a plurality of variable gain amplifiers, and a plurality of antennas each coupled to one of the phase shifters and one of the variable gain amplifiers, the processor configured to adjust a phase shift of each of the phase shifters to steer an antenna array pattern by sequentially applying the tabularized phase parameters, the processor further configured to adjust a gain of each of the variable gain amplifiers to one or more of reduce a side lobe of the antenna array pattern, change a location of the side lobe, or adjust a width of a main lobe of the antenna array pattern.

10. The hearing device of claim 9, the memory is configured to store gain parameters tabularized as a function of the spatial steering direction; and the processor is configured to adjust a gain of each of the variable gain amplifiers by sequentially applying the tabularized gain parameters.

11. The hearing device of claim 10, wherein the phase and gain parameters stored in the memory account for head-loading effects on the antenna array pattern.

12. The hearing device of claim 9, wherein the processor is configured to steer the main lobe of the antenna array pattern in a direction of a desired radiofrequency signal source that increases or maximizes a signal-to-noise ratio of a radiofrequency signal received from the radiofrequency signal source.

13. The hearing device of claim 9, wherein the processor is configured to steer the main lobe of the antenna array pattern in a direction that increases or maximizes a signal-to-noise ratio of a received radiofrequency signal on a per channel frequency basis.

14. The hearing device of claim 9, wherein the processor is configured to steer the antenna array pattern in a direction that increases or maximizes a signal-to-noise ratio of a received radiofrequency signal while concurrently nulling a radiofrequency noise source or a multipath null contributor.

15. The hearing device of claim 9, wherein each of the antennas is disposed on a substrate having a dielectric constant of at least about 100.

16. The hearing device of claim 9, wherein the transceiver and the phased array antenna arrangement are configured to transmit and receive radiofrequency signals within a 2.4 GHz ISM frequency band.

17. A method implemented by a hearing device adapted to be worn at, on or in an ear of a wearer, the method comprising:

storing, in a memory coupled to a processor, phase parameters tabularized as a function of spatial steering direction, wherein the hearing device comprises a phased array antenna arrangement coupled to a radiofrequency transceiver and the processor, the phased array antenna arrangement comprising a plurality of antennas each coupled to one of a plurality of phase shifters; and adjusting, by the processor, a phase shift of each of the phase shifters to steer an antenna array pattern by sequentially applying the tabularized phase parameters.

18. The method of claim 17, wherein:

the phased array antenna arrangement comprises a plurality of variable gain amplifiers each coupled to one of the plurality of phase shifters and one of the plurality of antennas; and the method comprises:

adjusting, by the processor, a gain of each of the variable gain amplifiers to one or more of reduce a side lobe of the antenna array pattern, change a location of the side lobe, and adjust a width of a main lobe of the antenna array pattern.

19. The method of claim 17, wherein steering the antenna array pattern comprises steering a main lobe of the antenna array pattern in a direction that increases or maximizes a signal-to-noise ratio of a received radiofrequency signal.

20. The method of claim 17, wherein steering the antenna array pattern comprises steering a main lobe of the antenna array pattern in a direction that increases or maximizes a signal-to-noise ratio of a received radiofrequency signal on a per channel frequency basis.

21. The method of claim 17, wherein steering the antenna array pattern comprises steering the antenna array pattern in a direction that increases or maximizes a signal-to-noise ratio of a received radiofrequency signal while concurrently nulling a radiofrequency noise source or a multipath null contributor.

22. The method of claim 17, wherein:

the phased array antenna arrangement comprises a plurality of variable gain amplifiers each coupled to one of the plurality of phase shifters and one of the plurality of antennas; and the method comprises:

storing, in the memory coupled to the processor, gain parameters tabularized as a function of the spatial steering direction; and adjusting the phase shift of each of the phase shifters and a gain of each of the variable gain amplifiers by sequentially applying the tabularized phase and gain parameters.

23. The method of claim 17, comprising transmitting and receiving radiofrequency signals communicated on a per channel basis via the phased array antenna arrangement.

* * * * *